US010923943B2

(12) United States Patent
Chen et al.

(10) Patent No.: US 10,923,943 B2
(45) Date of Patent: Feb. 16, 2021

(54) BATTERY POWERED DEVICE WITH PRE-POWERED CIRCUIT

(71) Applicant: STL Technology Co., Ltd., Kaohsiung (TW)

(72) Inventors: Chia-Chang Chen, Kaohsiung (TW); Tao-Cheng Wu, Kaohsiung (TW)

(73) Assignee: STL TECHNOLOGY CO., LTD., Kaohsiung (TW)

( * ) Notice: Subject to any disclaimer, the term of this patent is extended or adjusted under 35 U.S.C. 154(b) by 272 days.

(21) Appl. No.: 15/925,113

(22) Filed: Mar. 19, 2018

(65) Prior Publication Data

US 2019/0123579 A1 Apr. 25, 2019

(30) Foreign Application Priority Data

Oct. 19, 2017 (CN) .......................... 2017 1 0974637

(51) Int. Cl.

| | |
|---|---|
| ***H02J 7/00*** | (2006.01) |
| ***H02J 9/06*** | (2006.01) |
| *H02M 3/158* | (2006.01) |
| *H02M 3/156* | (2006.01) |
| *H02M 1/32* | (2007.01) |

(52) U.S. Cl.

CPC ............ *H02J 9/061* (2013.01); *H02J 7/0029* (2013.01); *H02J 7/0068* (2013.01); *H02J 7/00306* (2020.01); *H02J 2207/20* (2020.01); *H02M 3/156* (2013.01); *H02M 3/158* (2013.01); *H02M 2001/327* (2013.01)

(58) Field of Classification Search

CPC ...... H02J 9/061; H02J 2207/20; H02J 7/0029; H02J 7/0068; H02J 7/0031; H02J 7/0063; H02H 5/042; H02H 7/18

USPC ........................................................ 320/112

See application file for complete search history.

(56) References Cited

U.S. PATENT DOCUMENTS 4,260,956 A * 4/1981 Harford .................. H03F 1/302 330/279
4,528,492 A * 7/1985 Inaniwa .................. H02J 7/008 320/150
5,045,768 A * 9/1991 Pelly ....................... H02J 7/008 320/164
5,506,991 A * 4/1996 Curry .................... G06F 3/0383 710/305
5,646,501 A * 7/1997 Fishman ............. H01M 10/425 320/112

(Continued)

FOREIGN PATENT DOCUMENTS

JP 2000324841 A * 11/2000 ............ H02J 7/0068

*Primary Examiner* — John T Trischler

(74) *Attorney, Agent, or Firm* — Chun-Ming Shih; HDLS IPR Services

(57) ABSTRACT

A battery powered device includes a battery pack, at least one switch, a power management chip, and a pre-powered circuit. The pre-powered circuit comprises a buck and current-limiting module. The buck and current-limiting module comprises at least one zener diode and at least one current-limiting resistor. When the switch is turned off, the battery pack will be powered to a system device by the pre-powered circuit. Thus, the battery pack can be powered to the system device by the pre-powered circuit even if the battery powered device is operated in a standby mode. Besides, the power management chip can be operated in the standby state when the battery powered device is powered by the pre-powered circuit, so as to reduce the consumption of the battery energy and therefore extend the powered time of the battery powered device.

5 Claims, 2 Drawing Sheets

18
B
A
183 181 183 181 183 181

(56) References Cited

U.S. PATENT DOCUMENTS 6,160,375 A * 12/2000 Horie .................... H02J 7/0016 320/116
6,275,002 B1 * 8/2001 Chen .................... H01M 10/46 320/111
6,331,764 B1 * 12/2001 Oglesbee ............. H01M 10/42 320/136
7,154,234 B2 * 12/2006 Romano ................ H05B 39/08 315/291
7,274,116 B2 * 9/2007 Inoue .................... H02J 7/0063 307/100
7,579,716 B2 * 8/2009 Sato .................. G03G 15/2039 307/80
7,880,434 B2 * 2/2011 White .................. H02J 7/0016 320/116
7,969,121 B2 * 6/2011 Smith ................. H02M 3/1584 320/167
8,035,251 B2 * 10/2011 Lai ......................... H02J 9/062 307/46
8,119,275 B2 * 2/2012 Lee ...................... H01M 2/342 429/100
8,120,326 B2 * 2/2012 Heinrich ............ H01M 10/425 320/136
8,330,436 B2 * 12/2012 Oraw ..................... H02J 1/102 323/268
8,575,894 B2 * 11/2013 White .................. H02J 7/0016 320/116
8,829,722 B2 * 9/2014 Kusch .................. H02J 7/1423 307/82
8,847,554 B2 * 9/2014 Sunderlin .......... H01M 10/482 320/136
8,890,494 B2 * 11/2014 Gasperi ................ H02M 3/156 323/266
8,912,769 B2 * 12/2014 Lin .................... H02M 3/1582 323/224
8,922,166 B2 * 12/2014 White .................. H02J 7/0016 320/118
9,077,196 B2 * 7/2015 Sim ...................... H02J 7/0063
9,099,871 B2 * 8/2015 White .................. H02J 7/0016
9,172,303 B2 * 10/2015 Vasadi ................. H02M 3/158
9,219,366 B2 * 12/2015 Kim ......................... H02J 3/32
9,318,952 B2 * 4/2016 Oraw ..................... H02J 1/102
9,525,301 B2 * 12/2016 White .................. H02J 7/0016
9,711,962 B2 * 7/2017 Andrea ................. H02H 9/002
10,033,204 B2 * 7/2018 Huang ................. H02J 7/0045
10,199,844 B2 * 2/2019 Horie ................... H02J 7/0047
10,250,043 B2 * 4/2019 White .................. H02J 7/0016
10,578,675 B2 * 3/2020 Liang .................. G01R 31/367
2001/0019256 A1 * 9/2001 Olsson ................. H02J 7/0016 320/118
2002/0085837 A1 * 7/2002 Yang ...................... H02P 7/281 388/800
2003/0179034 A1 * 9/2003 Melis ..................... H02J 7/345 327/427
2003/0232237 A1 * 12/2003 Nakagawa .......... H01M 10/441 429/61
2004/0036446 A1 * 2/2004 Iwashima ............ G01R 31/396 320/116
2005/0219864 A1 * 10/2005 Furukoshi ............ H02M 3/156 363/16
2006/0006850 A1 * 1/2006 Inoue ................. H02J 2207/20 323/265
2006/0139021 A1 * 6/2006 Taurand ................. H02M 3/07 323/290
2006/0186867 A1 * 8/2006 Kataoka ............... H02M 3/158 323/282
2008/0013236 A1 * 1/2008 Weng ................... H02M 3/156 361/91.1
2008/0129219 A1 * 6/2008 Smith ................. H02M 3/1582 315/291
2008/0150364 A1 * 6/2008 Chen ........................ H02J 1/10 307/65
2009/0009136 A1 * 1/2009 Heinrich ............... H01M 10/44 320/134
2009/0153124 A1 * 6/2009 Ishii ..................... H02M 3/156 323/290
2009/0289599 A1 * 11/2009 White .................. H02J 7/0068 320/120
2009/0322304 A1 * 12/2009 Oraw ..................... H02J 1/102 323/312
2010/0008117 A1 * 1/2010 Luthi ..................... H02J 9/005 363/126
2010/0149706 A1 * 6/2010 Lee ...................... H01M 2/342 361/58
2011/0089901 A1 * 4/2011 White .................. H02J 7/0068 320/118
2011/0095615 A1 * 4/2011 Li .......................... H02J 9/061 307/80
2011/0130983 A1 * 6/2011 Yang ................... G01R 31/396 702/63
2012/0080945 A1 * 4/2012 Vasadi ................. H02M 3/158 307/31
2012/0086400 A1 * 4/2012 White .................. H02J 7/0016 320/118
2012/0206116 A1 * 8/2012 Fricker ................ H02M 3/158 323/271
2012/0274295 A1 * 11/2012 Lin .................... H02M 3/1582 323/282
2012/0319658 A1 * 12/2012 White .................. H02J 7/0016 320/134
2013/0051101 A1 * 2/2013 Cao ........................ H02J 9/061 363/126
2013/0058141 A1 * 3/2013 Oraw ..................... H02J 1/102 363/60
2013/0121048 A1 * 5/2013 Gasperi ................ H02M 3/156 363/89
2013/0187619 A1 * 7/2013 Dunipace ............... G05F 1/613 323/225
2013/0221924 A1 * 8/2013 Sim ...................... H02J 7/0063 320/112
2014/0002003 A1 * 1/2014 Kim ......................... H02J 7/00 429/158
2014/0009106 A1 * 1/2014 Andrea ................. H02H 9/002 320/107
2014/0028259 A1 * 1/2014 White .................. H02J 7/0068 320/118
2014/0159681 A1 * 6/2014 Oraw ..................... H02J 1/102 323/271
2015/0054479 A1 * 2/2015 Shiwaya .............. H02M 3/158 323/271
2015/0295427 A1 * 10/2015 White .................. H02J 7/0016 320/134
2015/0295494 A1 * 10/2015 Gong ................ H05B 41/2828 315/224
2015/0340894 A1 * 11/2015 Horie ....................... H02J 7/00 320/107
2016/0016483 A1 * 1/2016 Yasunori ............... B60L 50/40 320/162
2016/0064963 A1 * 3/2016 Huang ............... H02J 2207/40 320/114
2016/0064965 A1 * 3/2016 White .................. H02J 7/0016 320/134
2016/0181918 A1 * 6/2016 Herfurth ............... H05B 45/37 315/291
2016/0301235 A1 * 10/2016 Okanoue .......... H02J 7/007184
2017/0201109 A1 * 7/2017 Meacham, II ........ H02J 7/0029
2017/0271863 A1 * 9/2017 Andrea ................. H02H 9/002
2017/0271864 A1 * 9/2017 Andrea ................. H02H 9/002
2017/0271865 A1 * 9/2017 Andrea ................. H02H 9/002
2018/0034365 A1 * 2/2018 Sicard .................. H02M 3/158
2018/0337536 A1 * 11/2018 Li .................... H02J 7/007194
2019/0148782 A1 * 5/2019 Chang .............. H01M 10/4207 429/98
2019/0227127 A1 * 7/2019 Liang ................... H02J 7/0047

* cited by examiner

BATTERY POWERED DEVICE WITH PRE-POWERED CIRCUIT

This non-provisional application claims priority claim under 35 U.S.C. § 119 (a) on China Patent Application No. 201710974637.4 filed Oct. 19, 2017, the entire contents of which are incorporated herein by reference.

FIELD OF THE INVENTION

The present invention relates to a battery powered device, particularly to a battery powered device capable of providing a standby power.

BACKGROUND

In order to avoid the power outage occurred during the system device performing the important task, the system device is able to be connected to an external battery powered device. When the power outage occurs, the required standby power that the system device performs the important task can be provided by the discharging of the system device.

In the past, the battery powered device is provided with a DC power converter (such as switched power converter or linear power converter) in the inside thereof. The battery powered device can buck the voltage of battery to the required working voltage of the system device by the DC power converter so as to power to the system device.

In general, the DC power converter is having the high cost of components that will increase the hardware cost of the battery powered device, and is having the higher power consumption that will easily cause the loss of battery energy, and is easy over-discharging during the discharging process, resulting in the damage of battery cell. Besides, a power management chip must be waked up when the battery powered device is powered via the DC power converter, so that the operation of the DC power converter can be controlled by the power management chip. However, the power management chip in a normal operation state is easy to cause that the battery energy of the battery powered device is exhausted quickly.

SUMMARY

It is one objective of the present invention to provide a battery powered device, which comprises a battery pack, at least one switch, a power management chip, and a pre-powered circuit. The battery pack can be powered to a system device via the pre-powered circuit even if the battery powered device is operated in a power-saving standby mode. Besides, the power management chip can be operated in a standby state when the battery powered device is powered to the system device via the pre-powered circuit, so as to reduce the consumption of the battery energy and therefore extend the powered time of the battery powered device.

It is another objective of the present invention to provide a battery powered device, in which the pre-powered circuit comprises a buck and current-limiting module. The buck and current-limiting module comprises at least one zener diode and at least one current limiting resistor. The discharging energy of the battery pack can be powered to the system device via the zener diode and the current limiting resistor. Thus, a minimum discharge voltage of the battery pack is limited by a voltage drop of the zener diode, a discharging current is limited by the current limiting resistor, thereby the thing that the battery pack is over-discharging and therefore damaged can be avoided.

It is another objective of the present invention to provide a battery powered device, wherein the pre-powered circuit further comprises a temperature protection module. When an operation temperature of the buck and current-limiting module exceeds a temperature threshold, the temperature protection module will generate a high impedance, so that a current loop between the battery pack, the pre-powered circuit, and the system device will be disconnected by the high impedance of the temperature protection module, in such a way that the buck and current-limiting module can avoid to be powered to the system device when over-heating, thereby the safety on the powered can be ensured.

To achieve the above objective, the present invention provides a battery powered device, which is used for providing a power to a system device, the battery powered device comprising: a battery pack consisted of a plurality of batteries; at least one switch connected between the battery powered device and the system device; a power management chip, connected to the switch, used for controlling the turning on or the turning off of the switch; and a pre-powered circuit connected between the battery pack and the system device, wherein the pre-powered circuit comprises a buck and current-limiting module, the buck and current-limiting module comprises at least one zener diode and at least one current limiting resistor, the zener diode is connected to the current-limiting resistor in a series, the battery pack is powered to the system device by the pre-powered circuit when the switch is turned off.

In one embodiment of the present invention, the switch is turned off by the controlling of the power management chip before an operation mode of the power management chip is to be transferred from a normal operation mode to a standby operation mode.

In one embodiment of the present invention, the pre-powered circuit further comprises a temperature protection module, the temperature protection module is connected to the buck and current-limiting module, and used for sensing an operation temperature of the buck and current-limiting module, a current loop between the battery pack, the pre-powered circuit, and the system device will be disconnected by the temperature protection module when the operation temperature of the buck and current-limiting module exceeds a temperature threshold.

In one embodiment of the present invention, the temperature protection module is an impedance element of positive temperature coefficient.

In one embodiment of the present invention, the temperature protection module is a thermistor, a polysilicon fuse, or a circuit breaker.

In one embodiment of the present invention, when the power management chip is operated in a normal operation mode, the switch will be turned on by the controlling of the power management chip, the battery pack is powered to the system device by the switch.

In one embodiment of the present invention, the power management chip receives a waking signal, the operation mode of the power management chip is transferred from the standby operation mode to the normal operation mode according to the waking signal.

In one embodiment of the present invention, the switch is a JFET, a MOSFET, a BJT, or a Relay.

DETAILED DESCRIPTION OF THE PREFERRED EMBODIMENTS

Figure 1:
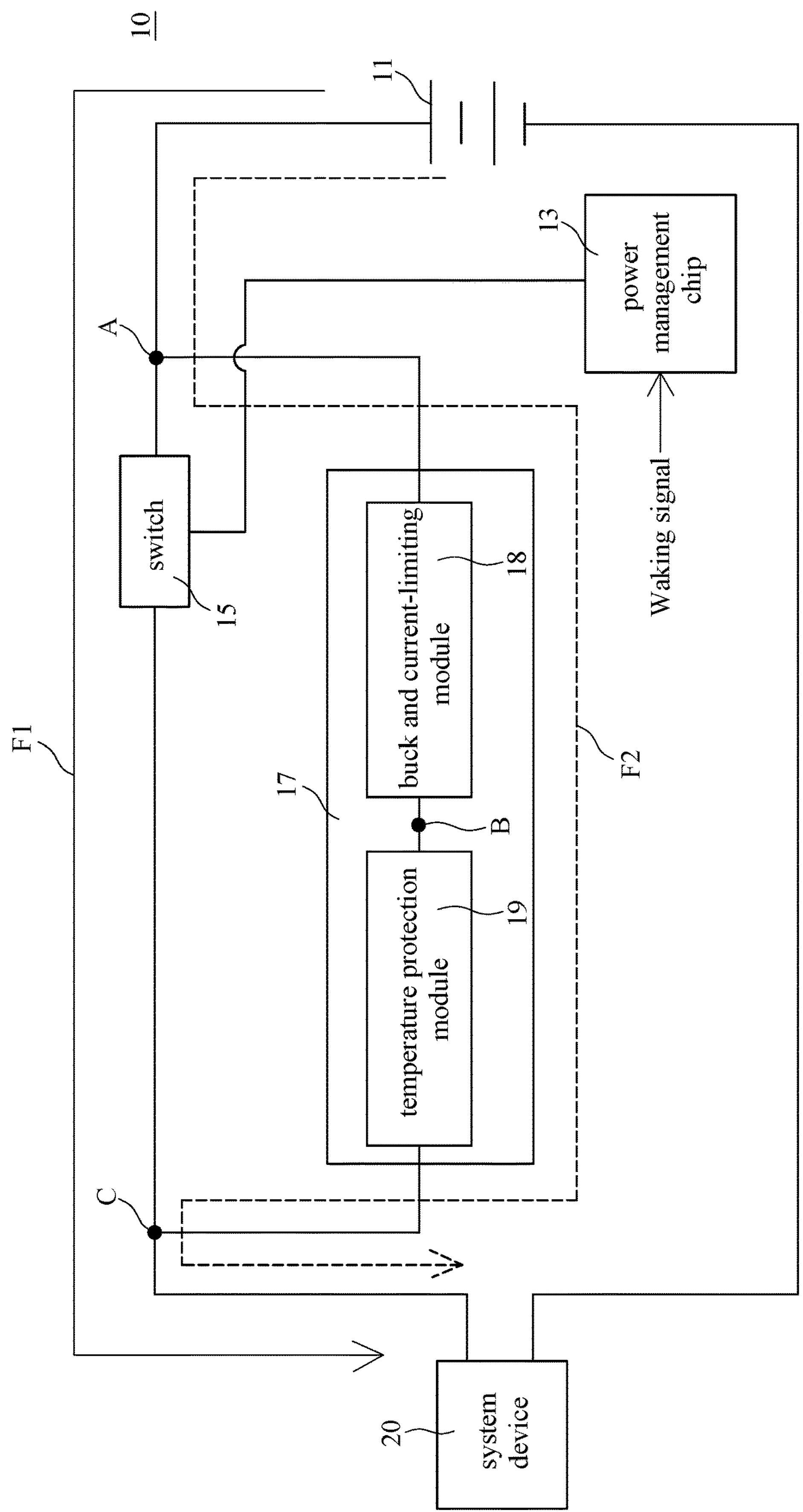
FIG. 1 is shown a circuit diagram of a battery powered device according to one embodiment of the present invention.

Referring to FIG. 1, there is shown a circuit diagram of a battery powered device according to one embodiment of the present invention. As shown in FIG. 1, the battery powered device 10 of the present invention is connected to a system device 20, and used to be powered to the system device 20. The battery powered device 10 comprises a battery pack 11, a power management chip 13, at least one switch 15, and a pre-powered circuit 17. The battery pack 11 is consisted of a plurality of batteries in serial. The switch 15 is connected between the battery pack 11 and the system device 20. The switch 15 can be a JFET (Junction Field Effect Transistor), a MOSFET (Metal Oxide Semiconductor Field Effect Transistor), a BJT (Bipolar junction Transistor), or a Relay. The pre-powered circuit 17 is connected between the battery pack 11 and the system device 20, and it is a bypass powered circuit.

The power management chip 13 is connected to the switch 15, used for controlling the turning on or the turning off of the switch 15. When the power management chip 13 is operated in a normal operation mode, it will issue an enable signal to the switch 15, so that the switch 15 is turned on according to the enable signal, and a discharging energy of the battery pack 11 is powered to the system device 20 via the switch 15 turned on. In the contrary, before the operation mode of the power management chip is to be transferred from a normal operation mode to a standby operation mode, the power management chip 13 will issue a disable signal to switch 15 so that the switch 15 is turned off according to the disable signal. Afterwards, when the switch 11 is turned off and the power management chip 13 is operated in the standby operation mode, the discharging energy of the battery pack 11 will be powered to the system device 20 via the pre-powered circuit 17. Accordingly, a normal powered loop is formed between the battery pack 11, the switch 15, and the system device 20, and a bypass powered loop is formed between the battery pack 11, the pre-powered circuit 17, and the system device 20.

Figure 2:
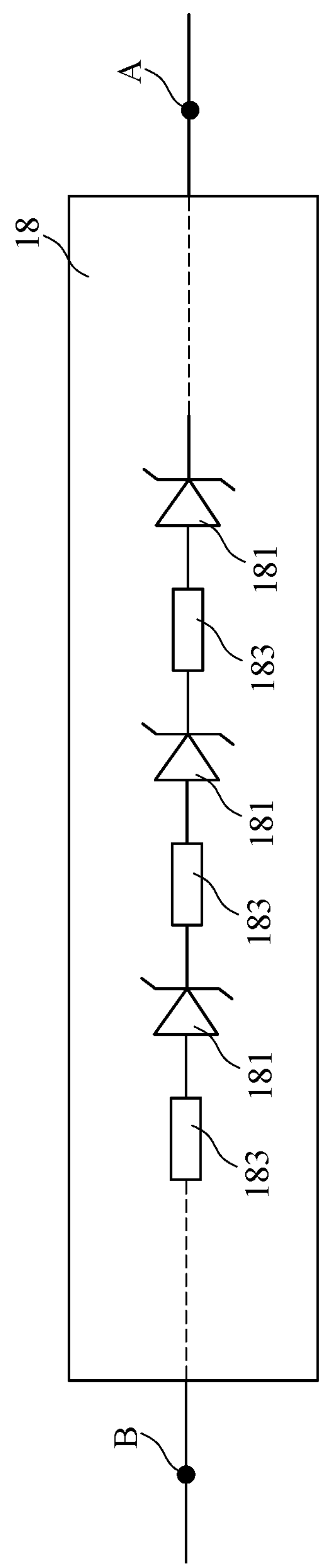
FIG. 2 is shown a circuit construction diagram of a buck and current-limiting module of a pre-powered circuit according to the present invention.

As shown in FIGS. 1 and 2, the pre-powered circuit 17 comprises a buck and current-limiting module 18. The buck and current-limiting module 18 comprises at least one zener diode 181 and at least one current limiting resistor 183. The zener diode 181 and the current limiting resistor 183 are connected together in a series. When the power management chip 13 is operated in the standby operation mode, the zener diode 181 can buck the battery voltage of the battery pack 11 to the required operating voltage of the system device 20, and the current limiting resistor 183 can limit the discharging current of the battery pack 11 within a current range allowed by the system device 20. Thus, the discharging energy of the battery pack 11 is powered to the system device 20 via the buck and current-limiting module 18. Besides, a minimum discharge voltage of the battery pack 11 is limited by a voltage drop of the zener diode 181, a discharging current of the battery pack 11 is limited by the current limiting resistor 183, thereby the thing that the battery pack 11 is over-discharging and therefore damaged can be avoided. In the present invention, the number of dispositions of the zener diodes 181 can be decided according to the required operation voltage of the system device 20, and the number of dispositions of the current limiting resistors 183 can be decided according to the current range allowed by the system device 20.

Accordingly, the battery pack 11 can still be powered to the system device 20 via the pre-powered circuit 17 when the battery powered device 10 of the present invention is operated in the power-saving standby mode, while the power management chip 13 operated in the standby state will reduce the consumption of battery energy of battery pack 11 so as to extend the powered time of the battery powered device 10.

Sequentially, the power management chip 13 is able to receive a waking signal, which is issued by the system device 20 or an external control device. When the power management chip 13 receives the waking signal, the operation mode of the power management chip 13 is able to be transferred from the standby operation mode to the normal operation mode according to the waking signal, and then the power management chip 13 sends an enable signal to the switch 15 so that the switch 15 can be again turned on by the enable signal.

The pre-powered circuit 17 further comprises a temperature protection module 19. The buck and current-limiting module 18 is connected to the system device 20 via the temperature protection module 19. In one embodiment of the present invention, the temperature protection module 19 is an impedance element of positive temperature coefficient, for example, thermistor, polysilicon fuse, or circuit breaker. An impedance value of the temperature protection module 19 will increase following to the temperature. The temperature protection module 19 is used for sensing an operation temperature of the buck and current-limiting module 18. When the operation temperature of the buck and current-limiting module 18 exceeds a temperature threshold, the temperature protection module 19 will generate a high impedance, so that the current loop between the battery pack, the pre-powered circuit, and the system device will be disconnected by the high impedance of the temperature protection module 19. By the configuration of the temperature protection module 19, the buck and current-limiting module 18 can avoid to be powered to the system device 20 when over-heating, thereby the safety on the powered can be ensured.

The above disclosure is only the preferred embodiment of the present invention, and not used for limiting the scope of the present invention. All equivalent variations and modifications on the basis of shapes, structures, features and spirits described in the claims of the present invention should be included in the claims of the present invention.

The invention claimed is:

1. A battery powered device, which is used for providing a power to a system device, the battery powered device comprising:

a battery pack consisted of a plurality of batteries;

at least one switch connected between the battery powered device and the system device;

a power management chip, connected to the switch, used for controlling the turning on or the turning off of the switch according to an operation mode of the power management chip; and a pre-powered circuit including an input, an output, and a buck and current-limiting module, wherein the input is connected between the switch and the battery pack, the output is connected between the switch and the system device, the buck and current-limiting module comprises at least one zener diode and at least one current limiting resistor in series with each other between the input and the output;

when the power management chip is operated in a normal operation mode, the switch is configured to be turned on by the controlling of the power management chip, the battery pack is configured to power the system device via the switch and the pre-powered circuit; when the power management chip is operated in a standby operation mode, the switch is configured to be turned off by the controlling of the power management chip, the battery pack is configured to power the system device via the pre-powered circuit.

2. The battery powered device according to claim 1, wherein the pre-powered circuit further comprises a temperature protection module configured between the buck and current-limiting module and the output, the zener diode, the current limiting resistor, and the temperature protection module in series with each other between the input and the output, the temperature protection module is a polysilicon fuse or an impedance element of positive temperature coefficient; when an operation temperature of the buck and current-limiting module exceeds a temperature threshold, the temperature protection module will generate a high impedance, such that a current loop between the battery pack, the pre-powered circuit, and the system device is configured to be disconnected by the high impedance of the temperature protection module.

3. The battery powered device according to claim 1, wherein the switch is a JFET, a MOSFET, a BJT, or a Relay.

4. The battery powered device according to claim 1, wherein the switch is configured to be turned off by the controlling of the power management chip before the operation mode of the power management chip is to be transferred from the normal operation mode to the standby operation mode.

5. The battery powered device according to claim 4, wherein the power management chip is configured to receive a waking signal, the operation mode of the power management chip is configured to be transferred from the standby operation mode to the normal operation mode according to the waking signal.

* * * * *